(12) United States Patent
Holiday

(10) Patent No.: US 6,421,739 B1
(45) Date of Patent: Jul. 16, 2002

(54) FAULT-TOLERANT JAVA VIRTUAL MACHINE

(75) Inventor: Matthew R. Holiday, Allen, TX (US)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/239,225

(22) Filed: Jan. 30, 1999

(51) Int. Cl.[7] .................................................. G06F 9/46
(52) U.S. Cl. ........................ 709/330; 709/1; 714/1; 714/2; 714/47; 707/1
(58) Field of Search ................................. 709/201, 202, 709/203, 316, 328, 330; 714/1, 2, 47; 707/1, 10; 710/11

(56) References Cited

U.S. PATENT DOCUMENTS

| | | | | |
|---|---|---|---|---|
| 5,511,197 A | * | 4/1996 | Hill et al. | 709/328 |
| 5,577,251 A | * | 11/1996 | Hamilton et al. | 709/203 |
| 5,684,955 A | * | 11/1997 | Meyer et al. | 709/316 |
| 5,701,502 A | * | 12/1997 | Baker et al. | 709/201 |
| 5,737,607 A | * | 4/1998 | Hamilton et al. | 709/316 |
| 5,758,186 A | * | 5/1998 | Hamilton et al. | 710/11 |
| 5,787,251 A | * | 7/1998 | Hamilton et al. | 709/203 |
| 5,809,507 A | * | 9/1998 | Cavandish, III | 707/10 |
| 5,850,449 A | * | 12/1998 | McMains | 713/161 |
| 5,860,004 A | * | 1/1999 | Fowlow | 717/109 |
| 5,961,582 A | * | 10/1999 | Gaines | 709/1 |
| 5,999,988 A | * | 12/1999 | Pelegri-Llopart et al. | 709/330 |
| 6,003,065 A | * | 12/1999 | Yan et al. | 709/201 |
| 6,016,505 A | * | 1/2000 | Badovinartz et al. | 709/205 |

* cited by examiner

Primary Examiner—Majid Banankhah
(74) Attorney, Agent, or Firm—Carr Law Firm, L.L.P.

(57) ABSTRACT

A method for providing a first JVM with support for fault tolerance by using information maintained by the first JVM to checkpoint objects that are created, modified, and/or deleted during the process of responding to an event of a transaction. The checkpointed objects are sent to and stored in a second JVM such that the second JVM is fully capable of continuing the processing of the transaction in the event of the failure of the first JVM.

33 Claims, 18 Drawing Sheets

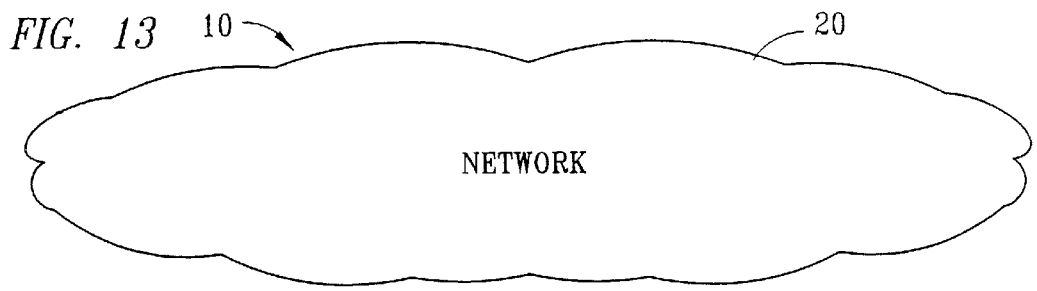
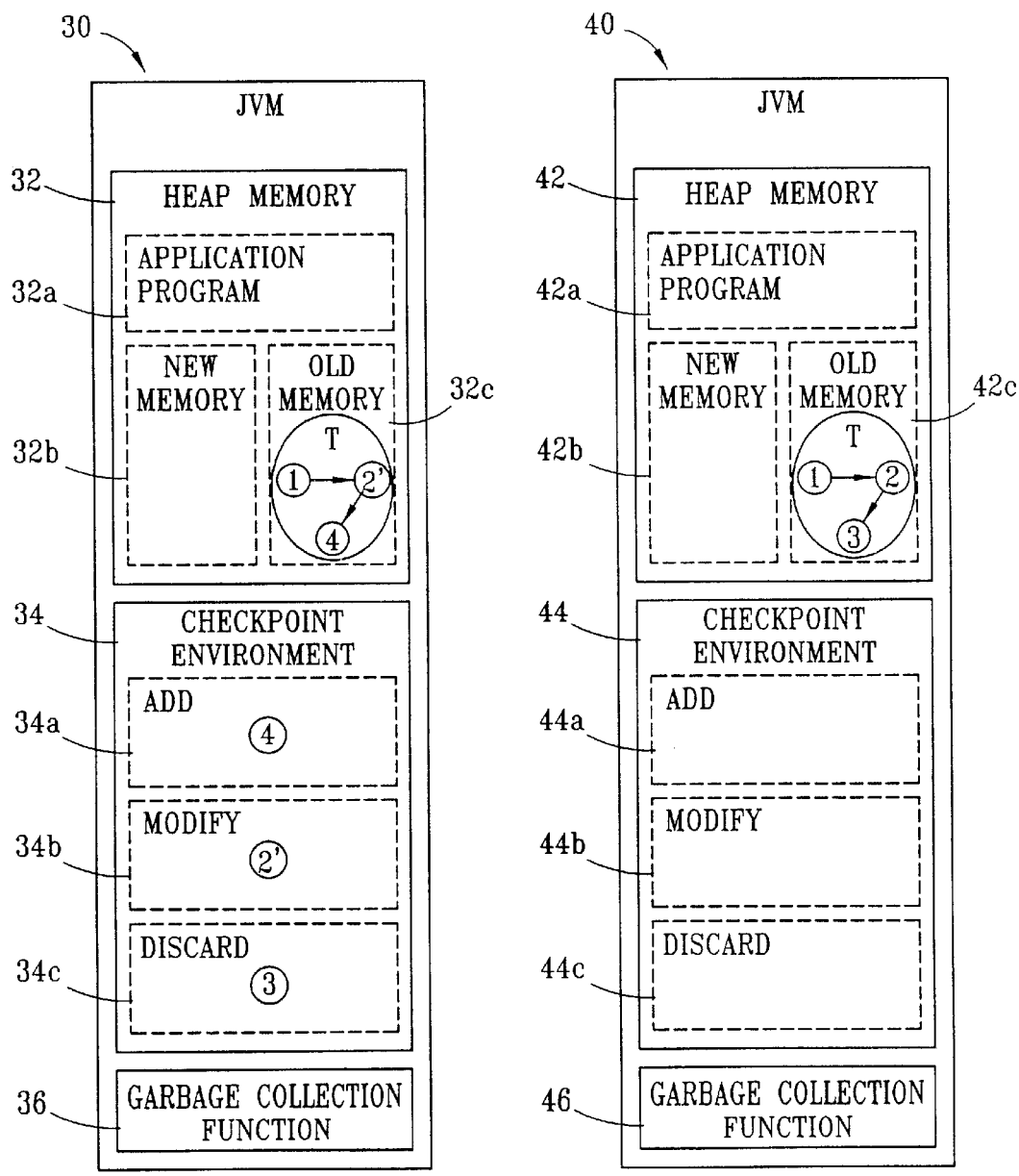
FIG. 13

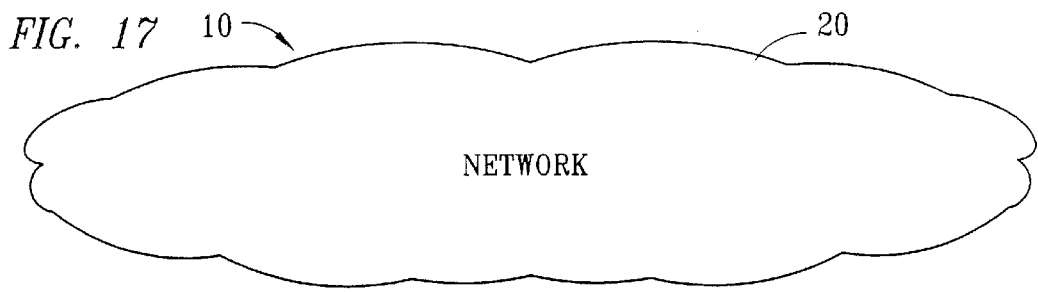
FIG. 17
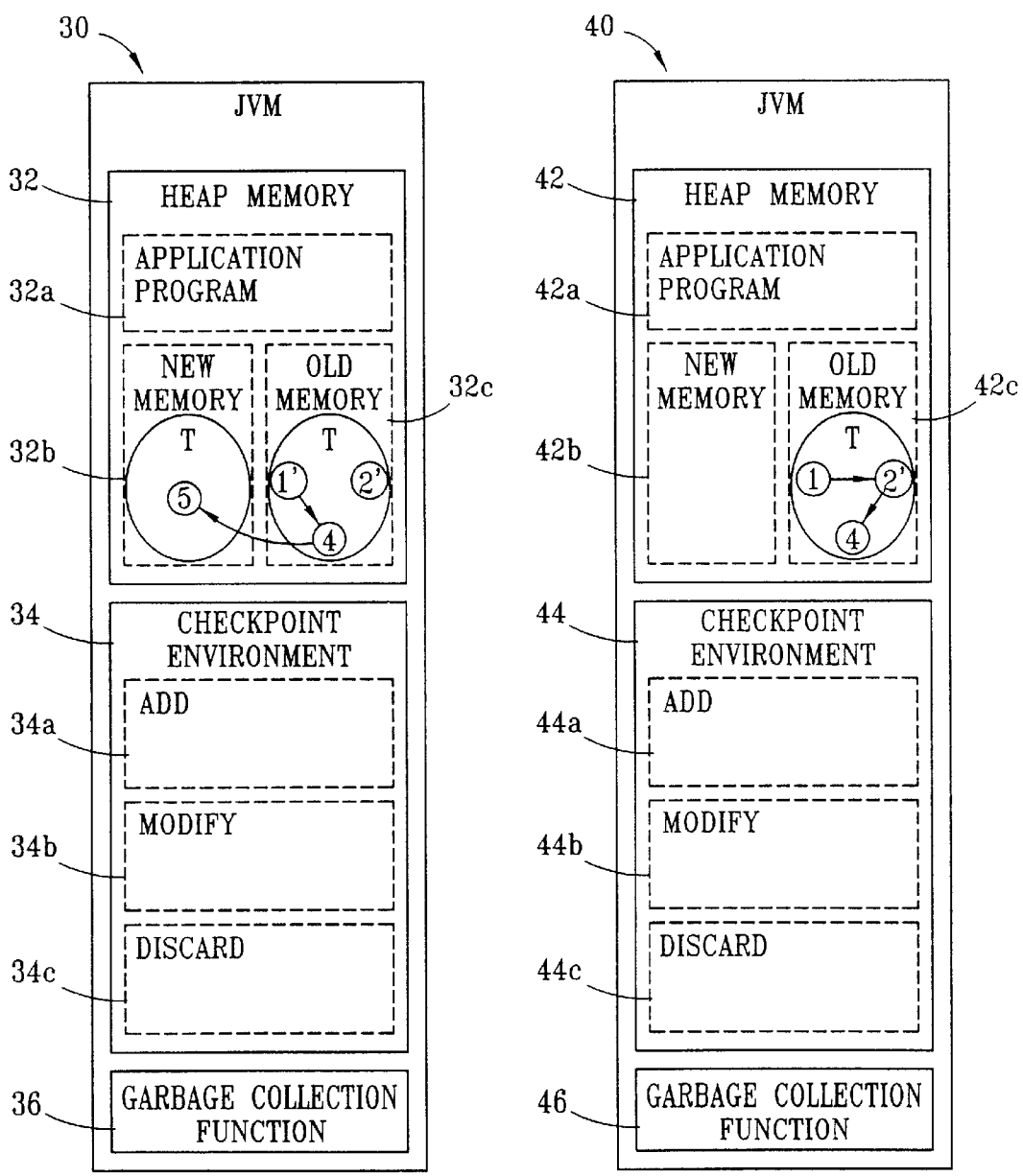

FAULT-TOLERANT JAVA VIRTUAL MACHINE

TECHNICAL FIELD

The invention relates generally to Java virtual machines and, more particularly, to a Java virtual machine with built-in support for fault-tolerant operation.

BACKGROUND OF THE INVENTION

Large-scale, complex computer systems are brought into use through integration of software programs with a hardware platform. It is important that such systems be reliable and, because many such systems are "servers," they are expected to run continuously for long periods of time without failure or interruption. As a result, various techniques, such as the use of special-purpose redundant hardware, are employed to ensure continuous service. Such techniques provide what is often collectively referred to as "fault tolerance" because they enable such systems to mask, i.e., recover, from a fault, such as the failure of a hardware component.

Fault-tolerance may also be obtained through software technology that utilizes commodity hardware that is less expensive. Frequently, such techniques utilize "checkpoints" wherein system status from one instance of an application is copied to a backup instance, such that the backup instance can take over processing using the copied system status as a starting point.

A telecommunication network is an example of a complex system that must be reliable. Telecommunication networks facilitate communications between a large number of public and private communications systems by providing numerous functions such as switching, accounting, time management, and the like. A telecommunications network provides such functions through network switches, or nodes, interconnected by links, or channels, of transmission media such as wire, fiber-optic cable, or radio waves. Some of the nodes are connected to one or more users.

Modern telecommunication networks require complex, automated switching and, to that end, software programs are written to provide reliable, dependable performance and efficient use of resources, as well as service features and functions, such as Call Waiting, Caller ID, and the like. Such systems may be configured in a number of different ways depending on what types of transmission media are used, what types of users are served, and what mix of features are purchased. As a result of such complexities and the large number of different configurations, it is difficult to operate such systems reliably and dependably. Software programs that operate such systems must, thus, be extremely reliable and achieve very a high fault-tolerance.

A programming language adapted for implementing software for such systems is "Java" which was introduced by Sun Microsystems, Inc., of Palo Alto, Calif. Java has been described as an object-oriented, distributed, interpreted, robust, secure, portable, architecture-neutral, multithreaded, and dynamic computer language.

To obtain fault-tolerance for software systems using Java, application software may be written such that all fault-tolerance capabilities, include the derivation of checkpoints, is built into the application program by its developer. However, experience has shown that this may not be an optimal solution. In many cases, changes to application programs are made without correctly changing the portions of the programs which effect the checkpointing, such that the checkpoints are not accurate and the system state copied to the backup is corrupt. In addition, mechanisms developed in application software may also be intrusive to the software source code (since additional code is added in ways that obfuscate understanding of the working of the system under normal conditions), or introduce additional inefficiencies into the software program.

Accordingly, a continuing search has been directed to the development of methods for mechanisms within the JVM which allow the JVM to support checkpointing in ways that are less intrusive, more efficient, and more likely to compute accurate checkpoint data.

SUMMARY OF THE INVENTION

According to the present invention, a method is disclosed for reliably and efficiently supporting fault-tolerance mechanisms within a Java virtual machine (JVM) by modifying the JVM itself. Such modifications to a first JVM permit the first JVM to use internal information maintained by the first JVM to checkpoint objects that are created, modified, and/or deleted during the process of responding to an event of a transaction. The checkpointed objects are sent to and stored in a second JVM such that the second JVM may take over the responsibilities of the first JVM should the first JVM fail. The application-level programmer is thus relieved of the burden of incorporating checkpointing into the source code and/or object code of an application program.

BRIEF DESCRIPTION OF THE DRAWINGS

For a more complete understanding of the present invention and the advantages thereof, reference is now made to the following descriptions taken in conjunction with the accompanying drawings, in which:

FIGS. 3–18 are a series of schematic diagrams illustrating the creation, modification, deletion, and movement of objects during the processing of events comprising a network transaction in accordance with the present invention.

DETAILED DESCRIPTION

Figure 1:
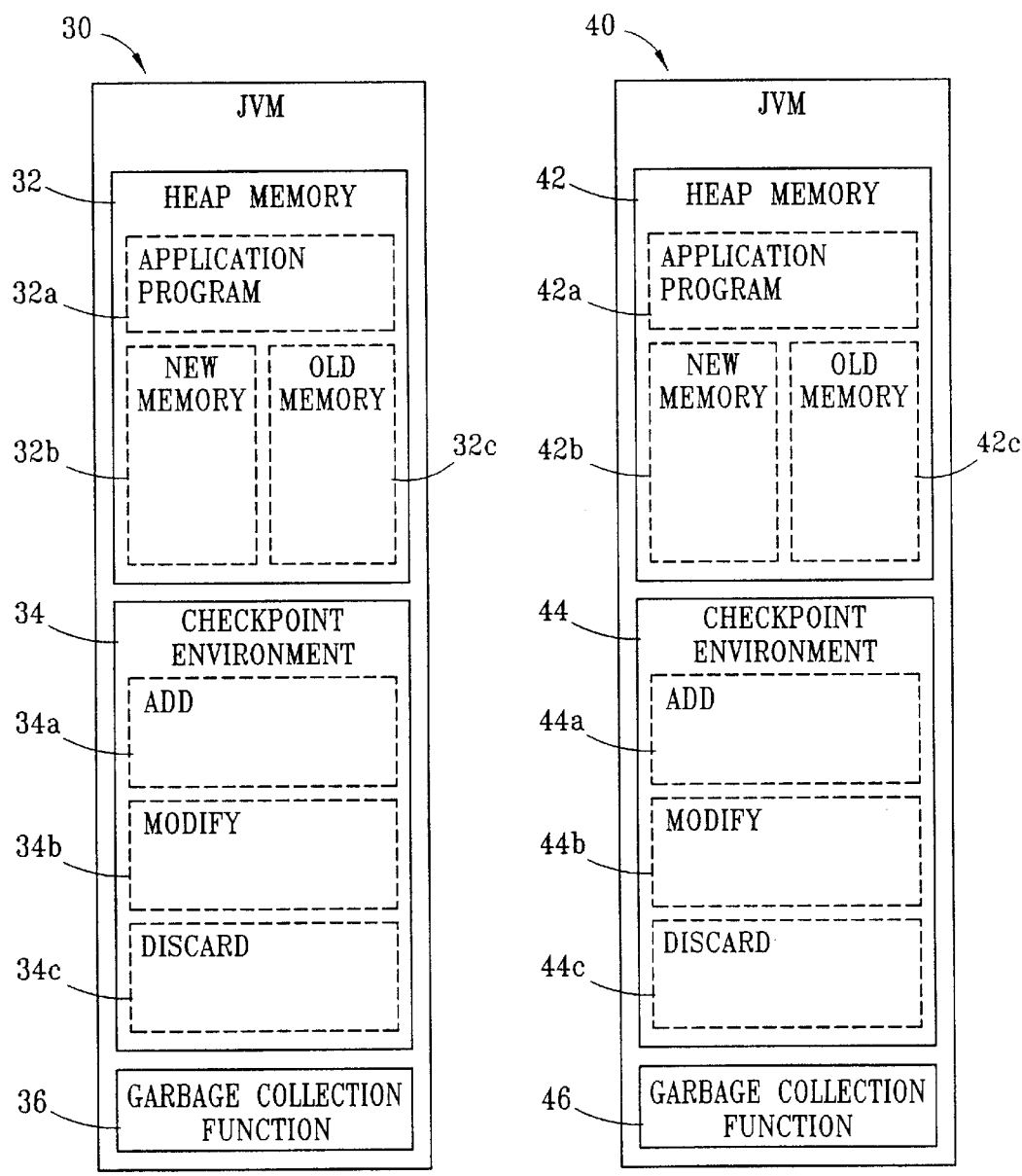
FIG. 1 is a schematic diagram illustrating an arrangement of Java Virtual Machines ("JVMs") interconnected to a network.

Referring to FIG. 1 of the drawings, the reference numeral 10 generally designates a system comprising a network 20 connected to a first Java Virtual Machines ("JVMs") 30 and to a second JVM 40 embodying features of the present invention. The network 10 may comprise, for example, a telecommunications network, such as a Public Land Mobile Network (PLMN, not shown) comprising, for example, a conventional telephone, a private branch exchange (PBX), an access tandem, a personal computer (PC) modem, access to the Internec, or the like.

The JVMs 30 and 40 may be implemented on the same or different computer platforms (not shown), which platforms may be selected from any of a number of different computer platforms, such as a personal computer ("PC"), a Macintosh computer, a Unix workstation, or the like, running any one of a number of different operating systems, such as Unix, Linux, Windows, MacOS, or the like. Such computer platforms and operating systems are considered to be well-known and will, therefore, not be described in further detail.

As described further below, the JVMs 30 and 40 include a heap memory 32 and 42, respectively, a checkpoint environment function 34 and 44, respectively, and a garbage collection function 36 and 46, respectively.

The heap memories 32 and 42 are partitioned into a portion 32a and a portion 42a, respectively, for storage of a suitable application program effective for processing transactions transmitted from the network 20 to the JVMs 30 and 40. It is not necessary that such application program include any function configured for checkpointing, described further below.

The garbage collection functions 36 and 46 are responsible for managing heap memory and freeing up heap memory occupied by data objects that are no longer referenced by the running application. Any of a number of different types of garbage collection functions are available and may be implemented for use within the JVMs 30 and 40; for example, generation-copying garbage collection functions which promote "live" objects (i.e., root object and objects referenced, or pointed to, by another object) from a "new" portion of memory to an "old" portion of memory may be used. For the sake of illustration and preference, the present invention will be described using such a generation-copying garbage collection function. To that end, the heap memories 32 and 42 are further partitioned into "NEW" memories 32b and 42b, respectively, and "OLD" memories 32c and 42c, respectively, for use by the respective garbage collection functions 36 and 46.

Such generation-copying garbage collection functions 36 and 46 preferably utilize a "write barrier" (not shown), well-known in the art, by which all changes to data in heaps that are managed by a respective garbage collection function are tracked. When possible, the present invention reuses the write barrier of the garbage collection functions 36 and 46, to thereby enhance the efficiency of the system 10. Alternatively, the JVMs 30 and 40 may utilize a garbage collection function which does not provide for a write barrier, and a write barrier may be added, in a manner well-known in the art, to the checkpointing function described below.

The software application program residing in the memories 32a and 42a preferably uses event-driven "run-to-completion" models of processing, wherein, once an event is received, it is processed to completion without interruption from other threads or processes in the JVM, and a response is generated as appropriate. The point of receipt of such an event and the point of completion of processing of such an event define two points in time between which points the application program adds, modifies, and/or discards data objects stored in the heap memories 32 and 42, and thereby changes the state of the program. In accordance with the present invention, such added, modified, and discarded data objects are tracked by the write barrier of the garbage collection function, as discussed further below. The collection of a copy of the data objects which are added, modified, and discarded during an event represents the change in state of the program, and is referred to herein as a checkpoint. The checkpoint, as used herein, thus represents the difference, that occurs during the execution of a software application program between two points in time, to the state of that program, such state being represented by the data objects in the heap memory 32 and 42 of the respective JVMs 30 and 40. The checkpoint may thus be used to update the state of the program in another JVM. Because the application program is considered herein to run each event to completion, the state of the application program which is required to process the next event is captured by objects on the heap, thereby rendering it unnecessary to copy the processor stack, machine registers, and the like to the checkpoint.

To facilitate the production of the checkpoint, the checkpoint environment 34 is partitioned into three memory portions, namely an "ADD" portion 34a, a "MODIFY" portion 34b, and a "DISCARD" portion 34c. Similarly, the checkpoint environment 44 is partitioned into three memory portions, namely an "ADD" portion 44a, a "MODIFY" portion 44b, and a "DISCARD" portion 44c. While not shown as such, the memory portions of the checkpoint environments 34 and 44 may be integrated with the heap memories 32 and 42 within the respective JVMs 30 and 40, and may use various data structures well-known in the art to track collections of objects in each portion. For the sake of illustration, it is assumed herein that a separate checkpoint environment 34 and 44 exists for each transaction, though such is not necessary. Also for the sake of illustration, the example discussed below does not show interleaved processing of events for multiple transactions, though, such would normally be the case; instead, as depicted herein, one transaction is processed before the system 10 accepts a next transaction.

While not shown, the JVMs 30 and 40 also include a system interface, an execution engine (for executing instructions contained in methods of loaded classes), threads, and the like. Still further, the JVMs 30 and 40 include a facility which maintains knowledge of the internal structure of all data objects of the application program in the memory 32a and 42a. These facilities are defined by the architecture of the respective JVM according to well-known specifications that a JVM must abide by in order to run Java software.

Figure 2:
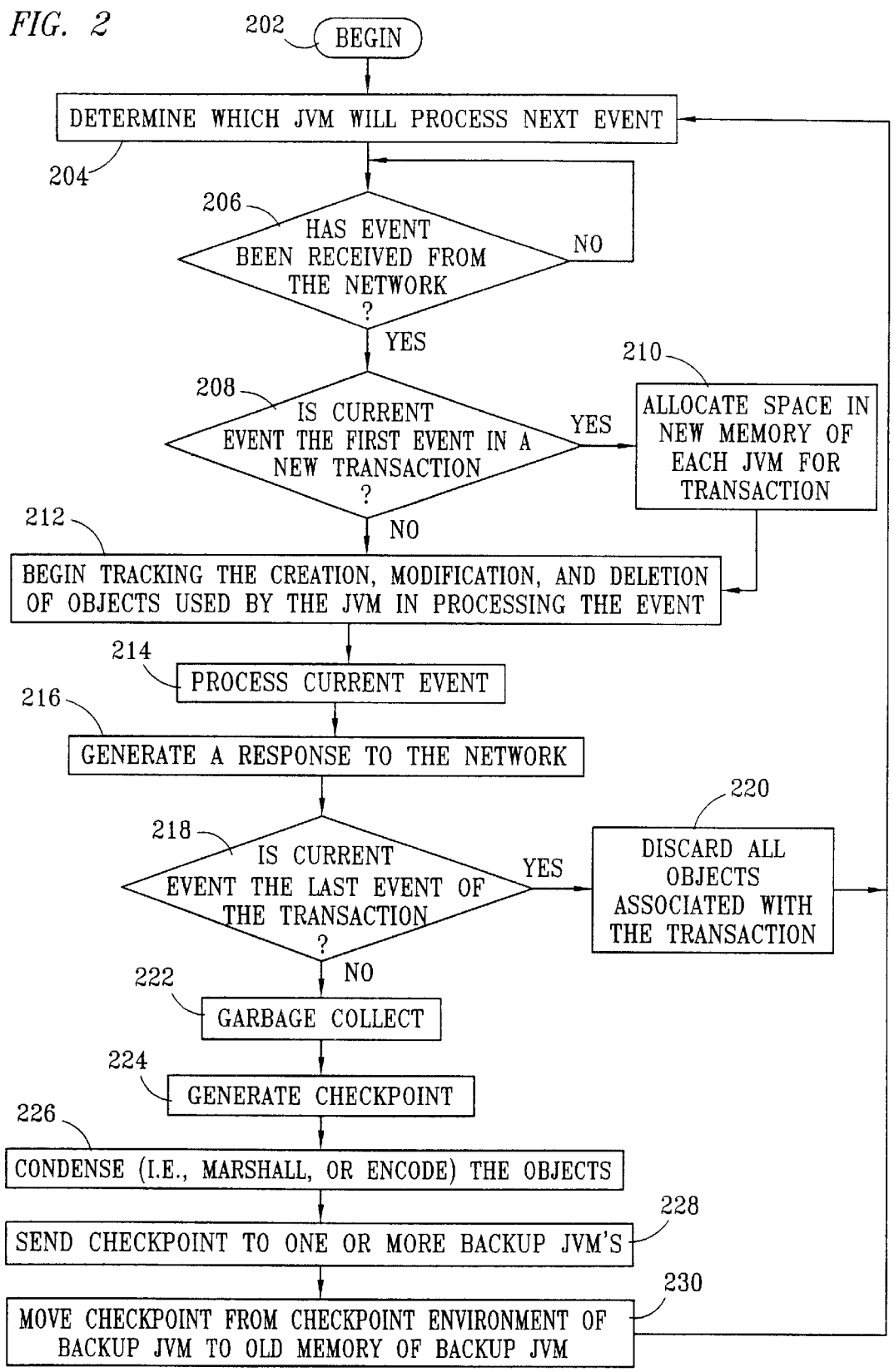
FIG. 2 is a flow chart illustrating steps for implementing the present invention.

In accordance with the present invention, the software defining the JVMs 30 and 40 is modified to use many features conventionally provided by the respective JVMs to provide the JVMs with the capability to checkpoint transactions. To that end, FIG. 2 is a flowchart showing steps implemented by the JVMs 30 and 40, as modified in accordance with the present invention, for checkpointing. For the sake of conciseness, operation of the present invention will be exemplified using a transaction "T" comprising three events (i.e., messages) such as, for example, a simple telephone call with an "off-hook event", an "answer message", and "hang-up", it being understood that a transaction may comprise more or less that three events. For the sake of illustration, the interconnections between the network 20 and the JVMs 30 and 40 will henceforth not be shown unless a message is being transmitted between them.

Referring to FIG. 2, in step 202, execution begins and proceeds to step 204 in which conventional protocols are used to determine which of the JVMs 30 or 40 will process the next event of a transaction received from the network 20. Such a determination may be based, for example, on the availability of a JVM or may be made to avoid using a JVM which is unreliable or which has failed. Techniques to make such a determination, such as the "process group" model, are well-known in the art and will not be discussed in detail herein. In the present example, it is assumed that, initially, the first JVM 30 will process the next transaction and is thus designated as a primary JVM, and that the second JVM 40 is designated as a backup JVM.

Figure 3:
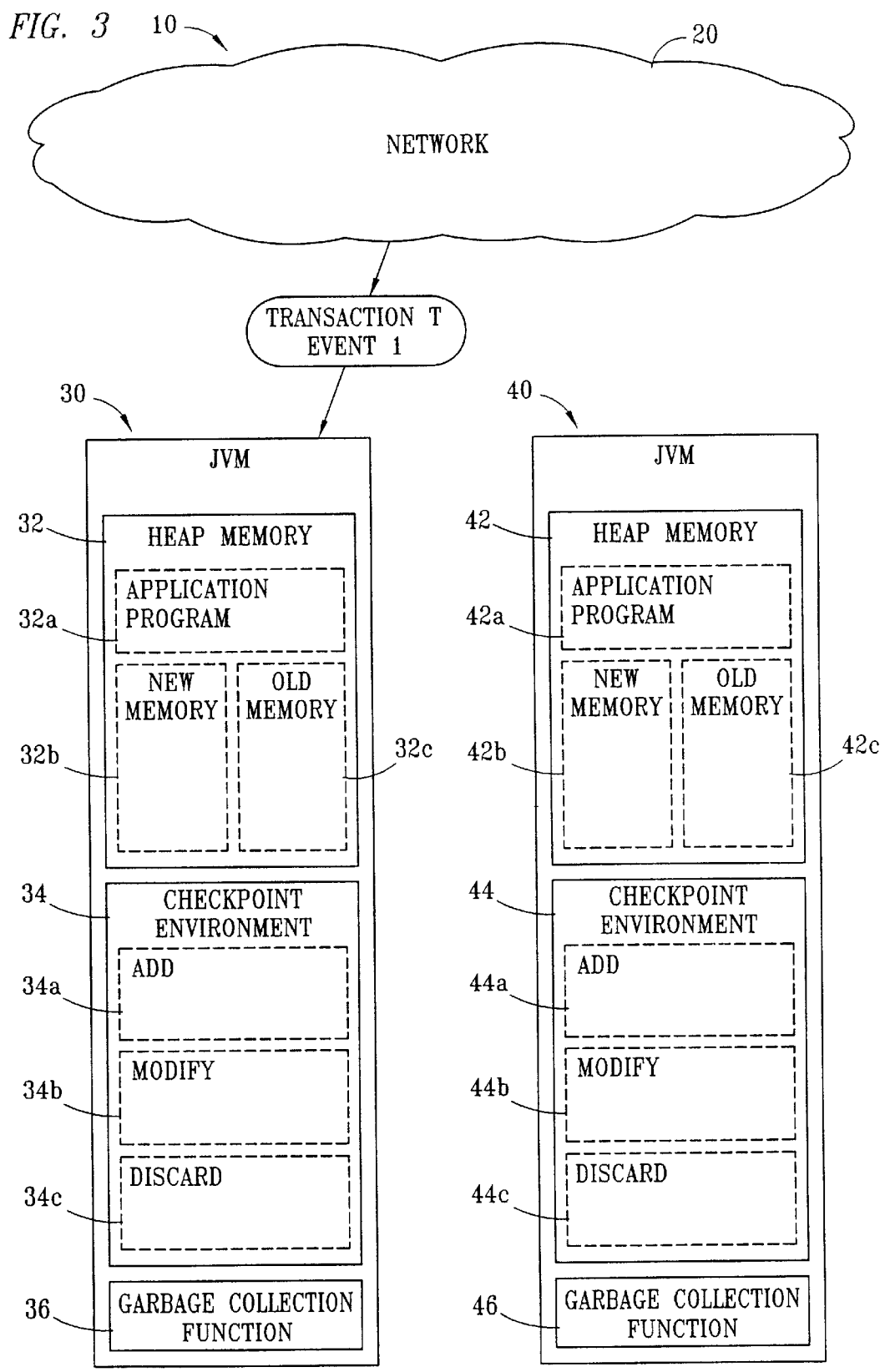

In step 206, the JVMs 30 and 40 await receipt of a first event of a next transaction from the network 20. Upon transmission from the network 20 of a first event of a next transaction, as depicted in FIG. 3, both JVMs 30 and 40 receive and record the event in the respective heap memories 32 and 42.

In step 208, a determination is made by the first JVM 30 whether the event received in step 206 is the first event of a new network transaction T. If it is determined that the received event is a first event of a new transaction T, then execution proceeds to step 210; otherwise execution proceeds to step 212. In step 210, space is allocated in the NEW memories 32b and 42b for storing objects created as events of the transaction T are processed, as discussed further below. Upon allocation of NEW memories 32b and 42b in step 208, execution proceeds to step 212.

In step 212, the write barrier begins tracking the creation, modification, and deletion of data objects associated with the transaction T, as the current event is processed, to thereby continually updating the checkpoint environment 34. All new objects are added to the ADD portion 34a, all modified objects are added to the MODIFY portion 34b, and the identity of all deleted objects is recorded in the DISCARD portion 34c.

Figure 4:
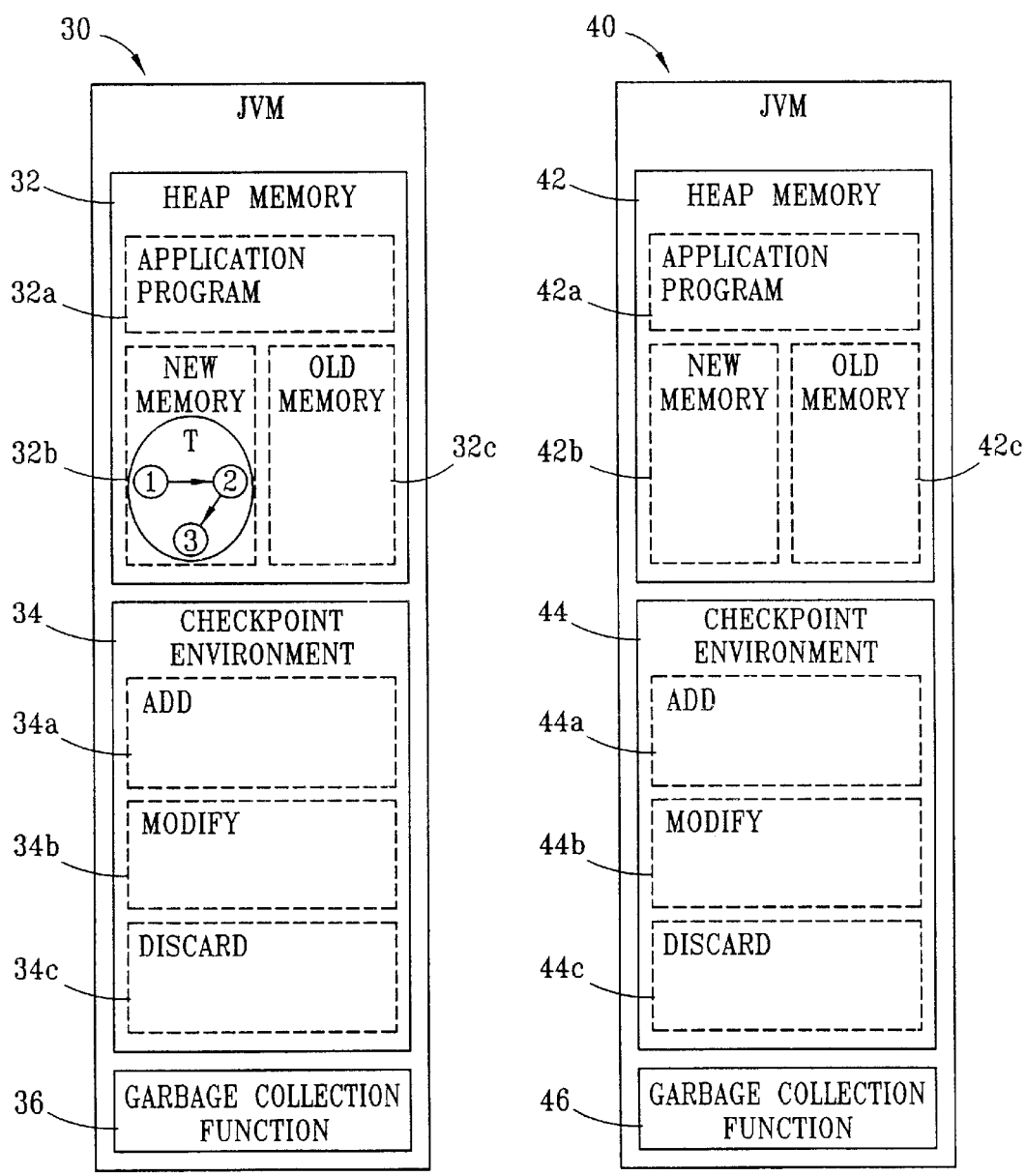
Figure 5:
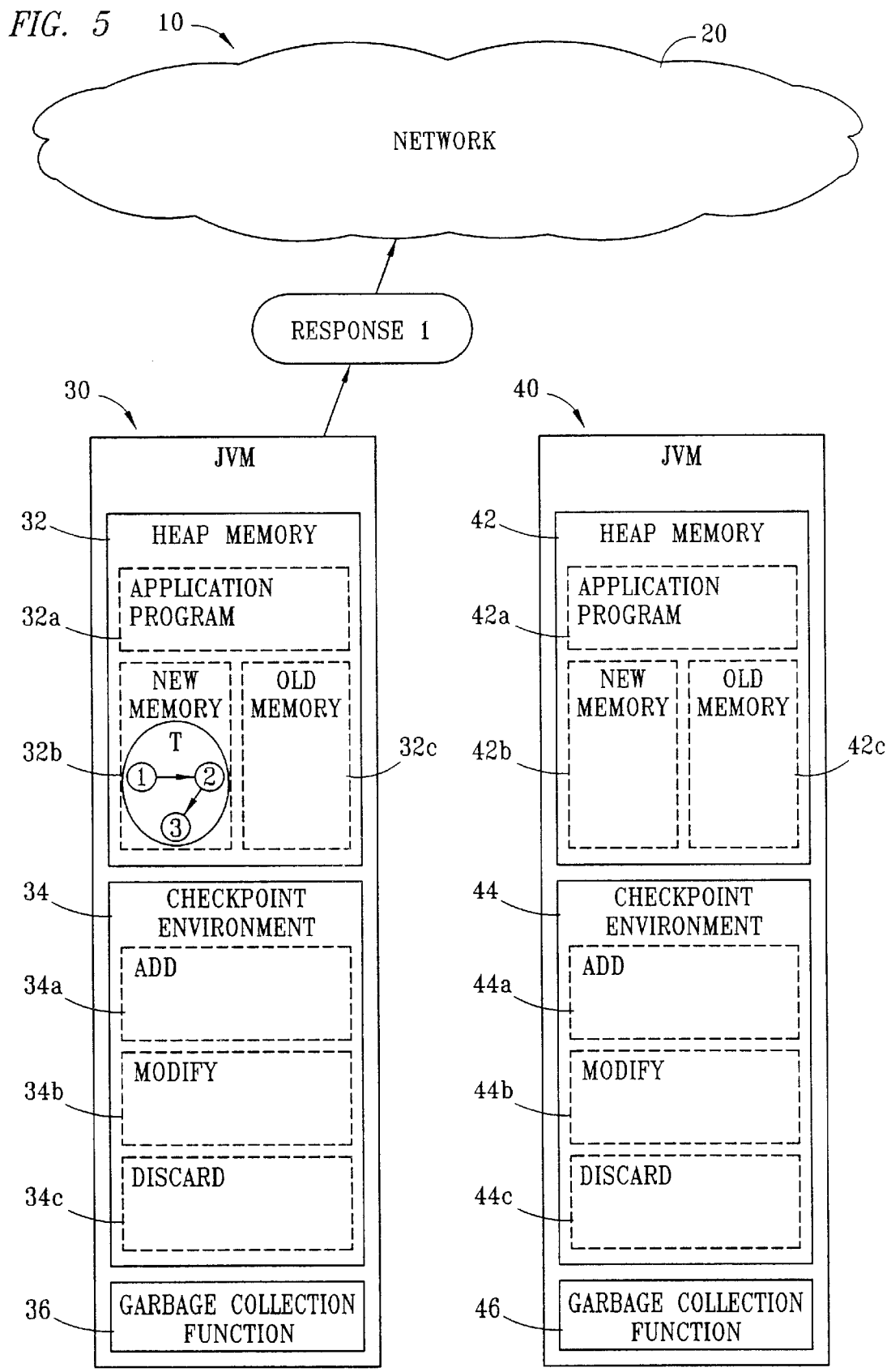

In step 214, the current event, as the first event in the sequence of the present example, is processed, in a manner well-known in the art, by a suitable application program stored in the memory portion 32a of the JVM 30. The processing of the event in step 214 is preferably run to completion. As the event is so processed, data objects, exemplified herein as objects 1, 2, and 3, are created for the transaction T, as depicted in FIG. 4, wherein the object 1 "points" to object 2, and the object 2 "points" to the object 3. The creation of data objects and pointers between data objects is considered to be well-known in the art and will therefore not be discussed further. Object 1 itself may be pointed to by data maintained in the processor's stack or register set, such that a garbage collection algorithm could locate it as a "live" object. In step 216, upon completion of the processing of the first event in step 214, an appropriate response is generated and transmitted to the network 20, as depicted in FIG. 5.

In step 218, the JVM 30 makes a determination whether the current event is the last event of the transaction T being processed. If it is determined that the current event is not the last event, then execution proceeds to step 204; otherwise, execution proceeds to step 220. At step 220, processing of the transaction T is complete and all data objects associated with the transaction T are discarded from both JVMs 30 and 40, and execution returns to step 204. For the present example, the event last processed (i.e., the first event) does not constitute the last event of the transaction T and execution will proceed from step 218 to step 222.

Figure 6:
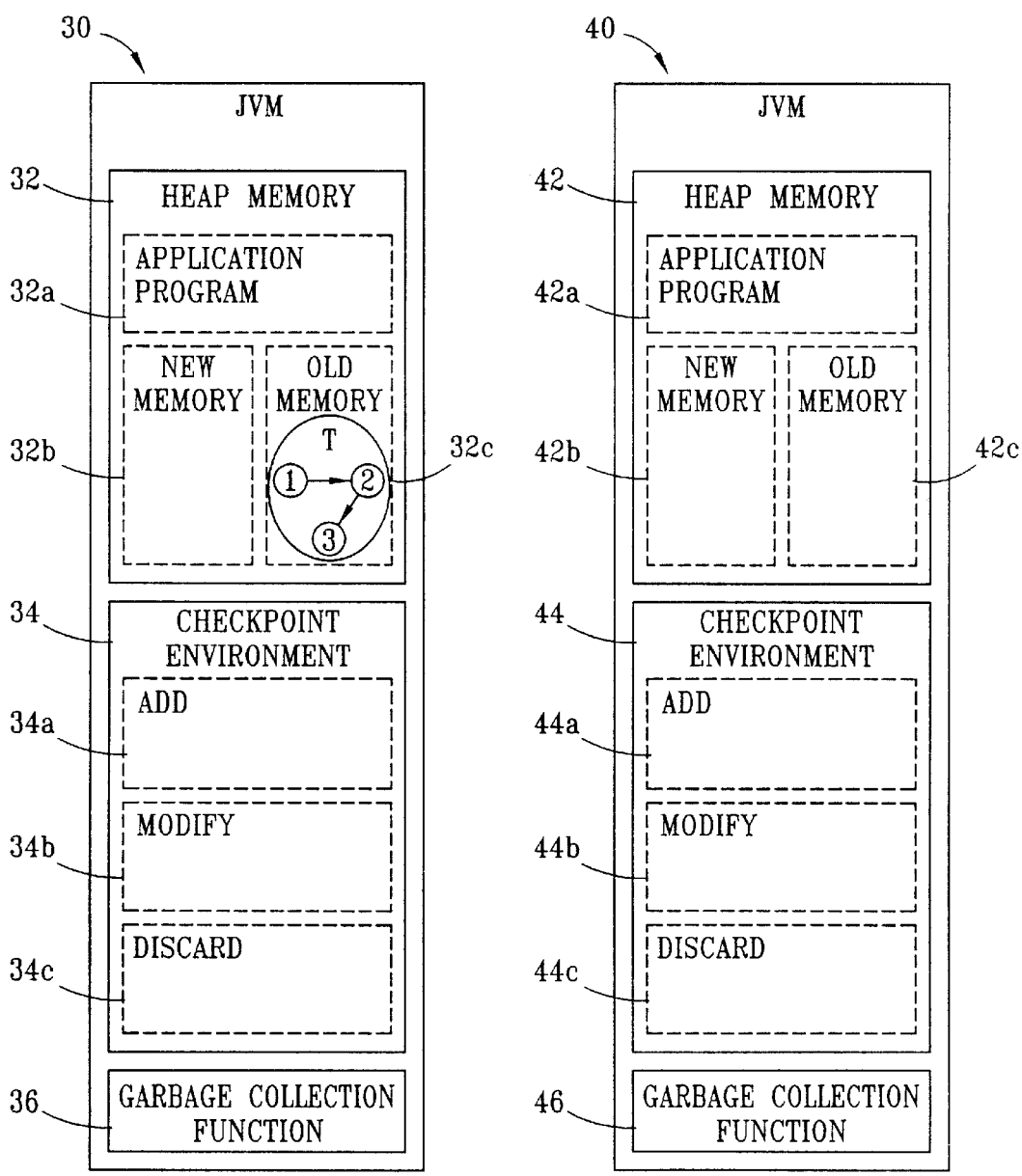

In step 222, the garbage collection function 36 is executed to eliminate any "dead" objects (i.e., objects not pointed to by another object) from the NEW memory 32b before the checkpoint is calculated. This step 222 avoids the case where objects that are no longer part of the transaction's state are copied to the backup JVM, and thus improves the overall efficiency of the checkpointing process. Accordingly, the data objects 1, 2, and 3 are "promoted" (i.e., moved) from the NEW memory 32b to the OLD memory 32c, as shown in FIG. 6. The use here for the purpose of illustration of a generation-copying garbage collection function does not rule out the use of other techniques. However, the use of such a collector, with collections tied to the cycle of event processing, can improve both the efficiency of collection and that of the checkpointing function described in this invention. Garbage collection is considered to be well-known in the art and will, therefore, not be described in further detail herein.

Figure 7:
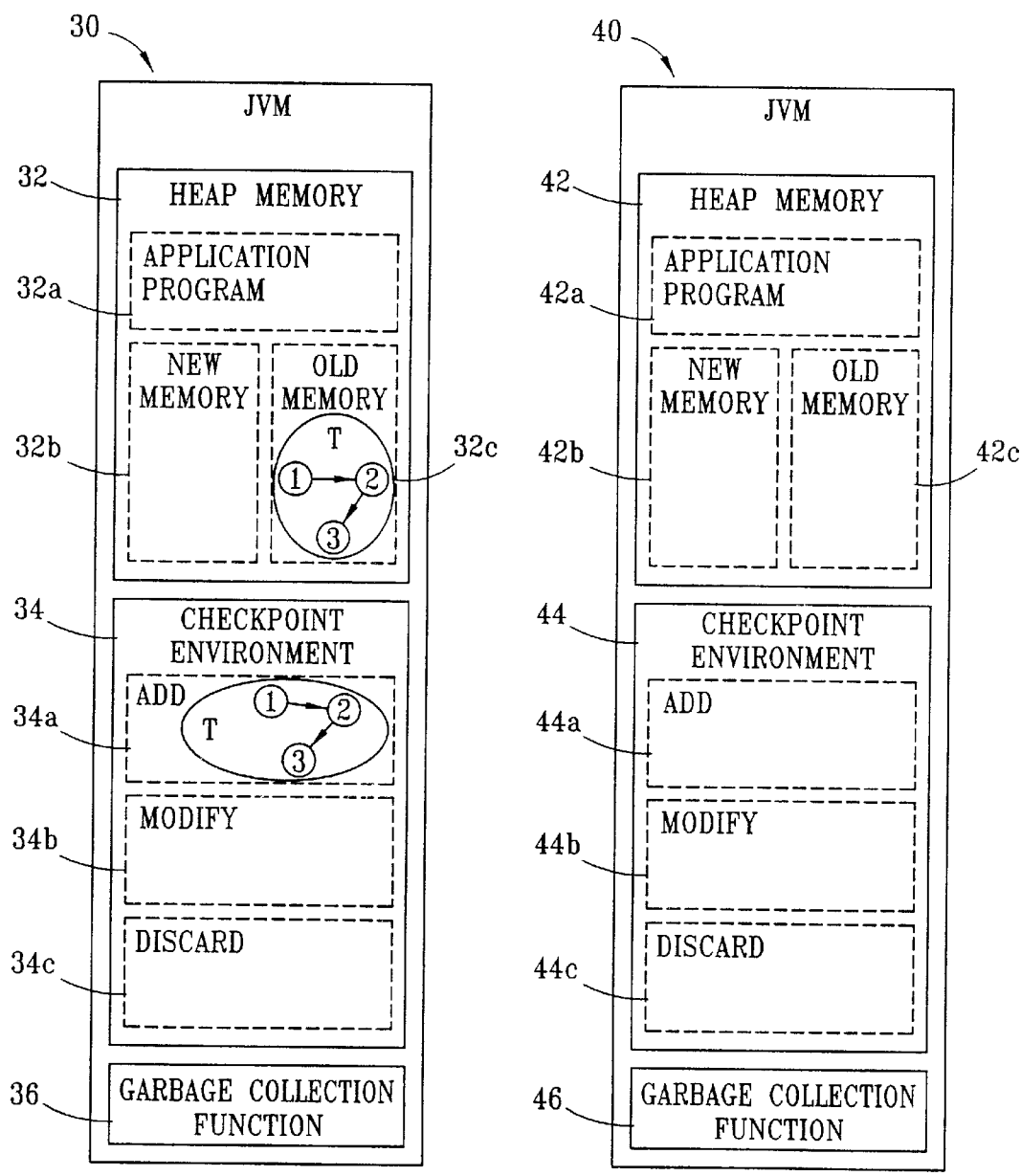

In step 224, the content of the checkpoint is calculated, and the write barrier discontinues tracking changes to the heap space (for the purpose of checkpointing). Calculation of the checkpoint utilizes data in the ADD (34a), MODIFY (34b) and DISCARD (34c) portions of the checkpoint environment 34 to identify changes to the program state so that, as discussed below, objects in the ADD and MODIFY portions may be copied to the backup JVM 40, and objects identified in the DISCARD portion may be deleted from the backup JVM 40. FIG. 7 illustrates the state of the checkpoint environment at step 224 after processing the first event.

In step 226, the objects identified in the checkpoint calculation of step 224 are "marshaled". Accordingly, each identified object is encoded to ensure that it can be successfully transmitted from one JVM to the other, even if the JVMs run on heterogeneous computer platforms. Any suitable encoding technique, such as serialization which is currently employed in Java for remote method invocation (RMI), may be used to encode the identified objects. In the process of encoding, pointers between objects are converted to object identifiers or "tags" that are not dependent on machine addresses (i.e., addresses to memory spaces in a particular machine), such that a JVM receiving the objects can recreate the pointer-based associations between objects. Techniques for encoding objects and representing pointers are well-known in the art and will not be discussed further. Objects are preferably marshaled within the JVM 30 using the JVM's internal knowledge about object structures and the efficiency of its internal software code. The checkpoint is formed from the encoded objects to be copied (from the ADD and MODIFY memory portions 34a and 34b) and the record identifying objects to be discarded (from the memory portion 34c), together with any administrative data necessary for managing the at least a portion of a checkpoint.

Figure 8:
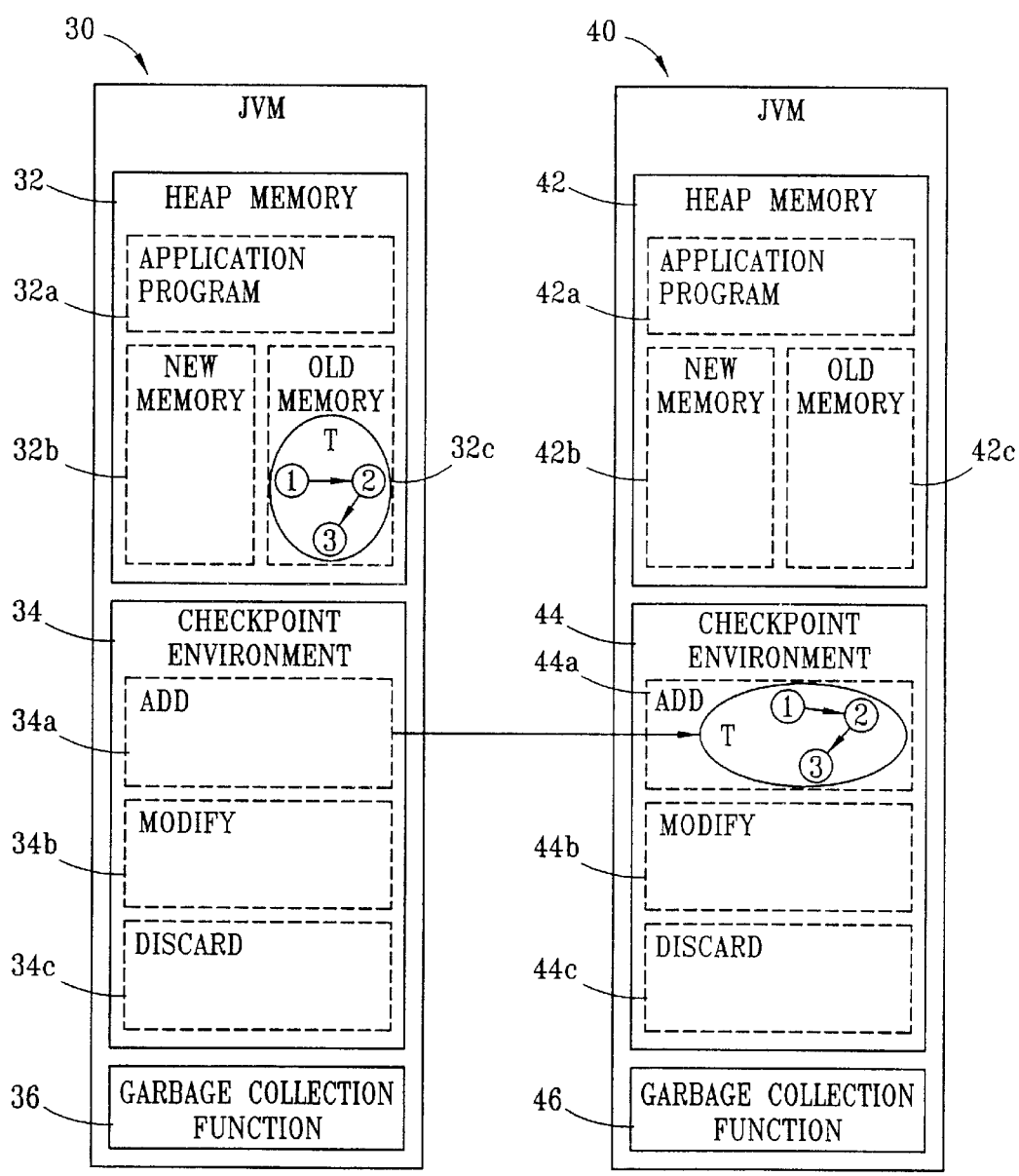

In step 228, the checkpoint generated in step 224, comprising all objects stored- in the ADD and MODIFY memory portions 34a and 34b and identified in the DISCARD memory portion 34c of the checkpoint environment 34, is delivered to the respective memory portions 44a, 44b, and 44c of the checkpoint environment 44 of the second JVM 40, for storage and recordation therein, as shown in FIG. 8. Various communication protocols well-known in the art are available for delivering the checkpoint message. The ADD (34a), MODIFY (34c), and DISCARD (34c) portions of the checkpoint environment 34 are cleared of data associated with the current (i.e., first) event of the transaction T.

Figure 9:
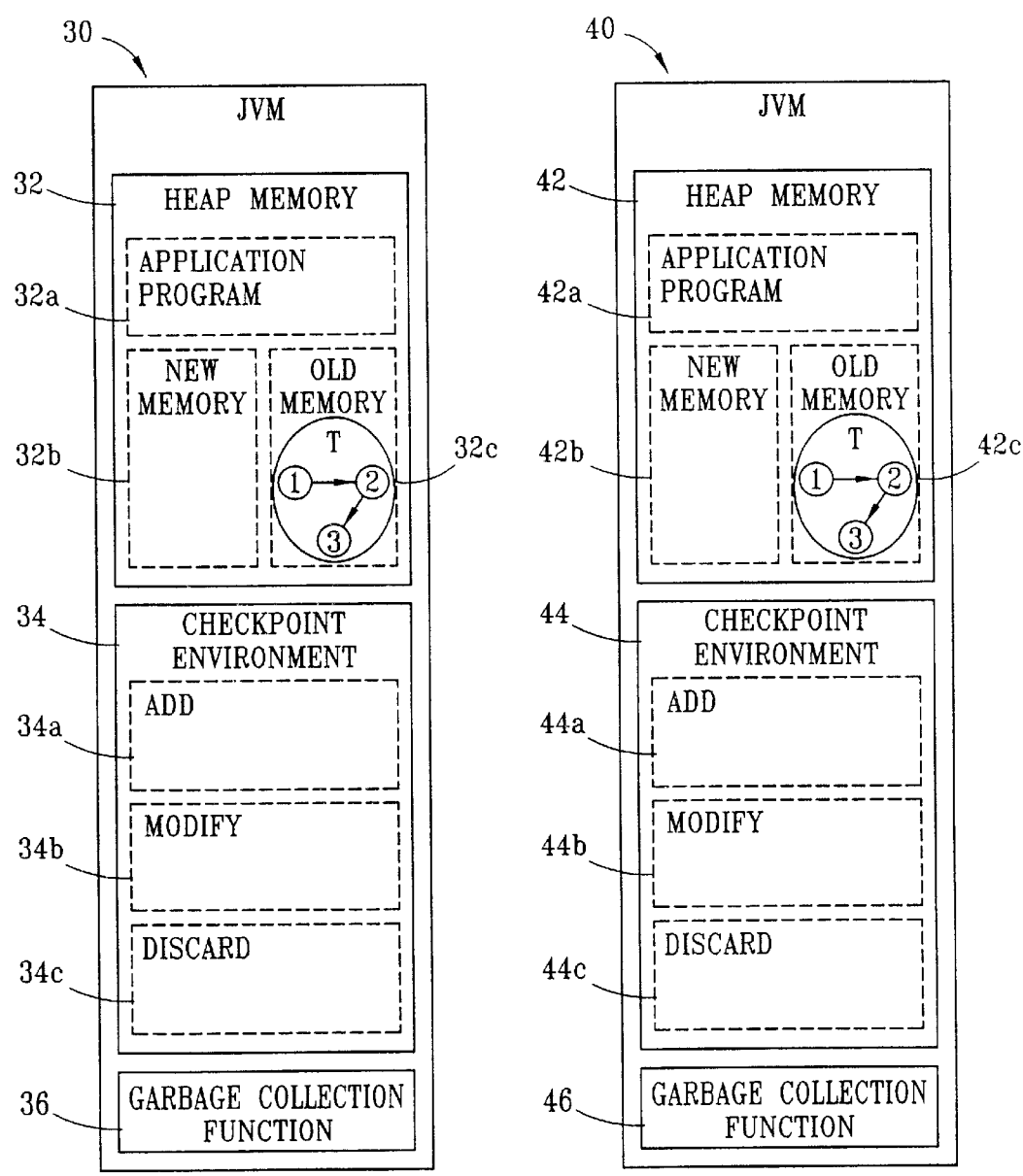

In step 230, the checkpoint stored in the checkpoint environment 44 is moved to the OLD memory 42c of the second JVM 40, as shown in FIG. 9. Additionally, the pointers are modified so that tags identifying objects pointed to are replaced with location addresses in the OLD memory 42c, so that pointers used by the first JVM 30 are correctly converted to point to the same objects in the second JVM 40.

Execution of the foregoing steps 228 and 230 is preferably performed immediately following step 226 so that the transaction state of memory in the JVMs 30 and 40 are at substantially all times virtually identical. Upon completion of step 230, execution returns to step 204.

It can be appreciated that the state of the transaction T in old memories 32c and 42c of the JVMs 30 and 40, respectively, as depicted in FIG. 9, are virtually identical. Therefore, either of the JVMs 30 or 40 may process the next event of the transaction T. This is particularly advantageous if the JVM 30 should fail or otherwise become unavailable to process the next event of the transaction T transmitted from the network 20.

In the event that the first JVM 30 fails prior to completely processing the event and generating output and a checkpoint, then that event must be processed by the backup JVM 40. The coordination function described above in step 204, using, for example, the "process group" model of software fault-tolerance, is responsible for handling such a failure. If (as shown in the present example) the event is the first event of the transaction, then the backup JVM 40 is effectively made the primary JVM and processes the transaction as if none of the steps described above had transpired.

In step 204, the JVMs 30 and 40 await the next event of the transaction T from the network 20. Upon receipt of the next event, i.e., the second event in the sequence of the present example, conventional protocols are implemented to determine which of the JVMs 30 or 40 will process the next event of the transaction T received from the network 20. In the present example, it is assumed that the JVM 30 has not failed and is available and will therefore continue to process the transaction T. Therefore, the JVM 30 will be designated to process the next event of the transaction T and continue as the primary JVM, and the second JVM 40 will continue as a backup JVM.

Figure 10:
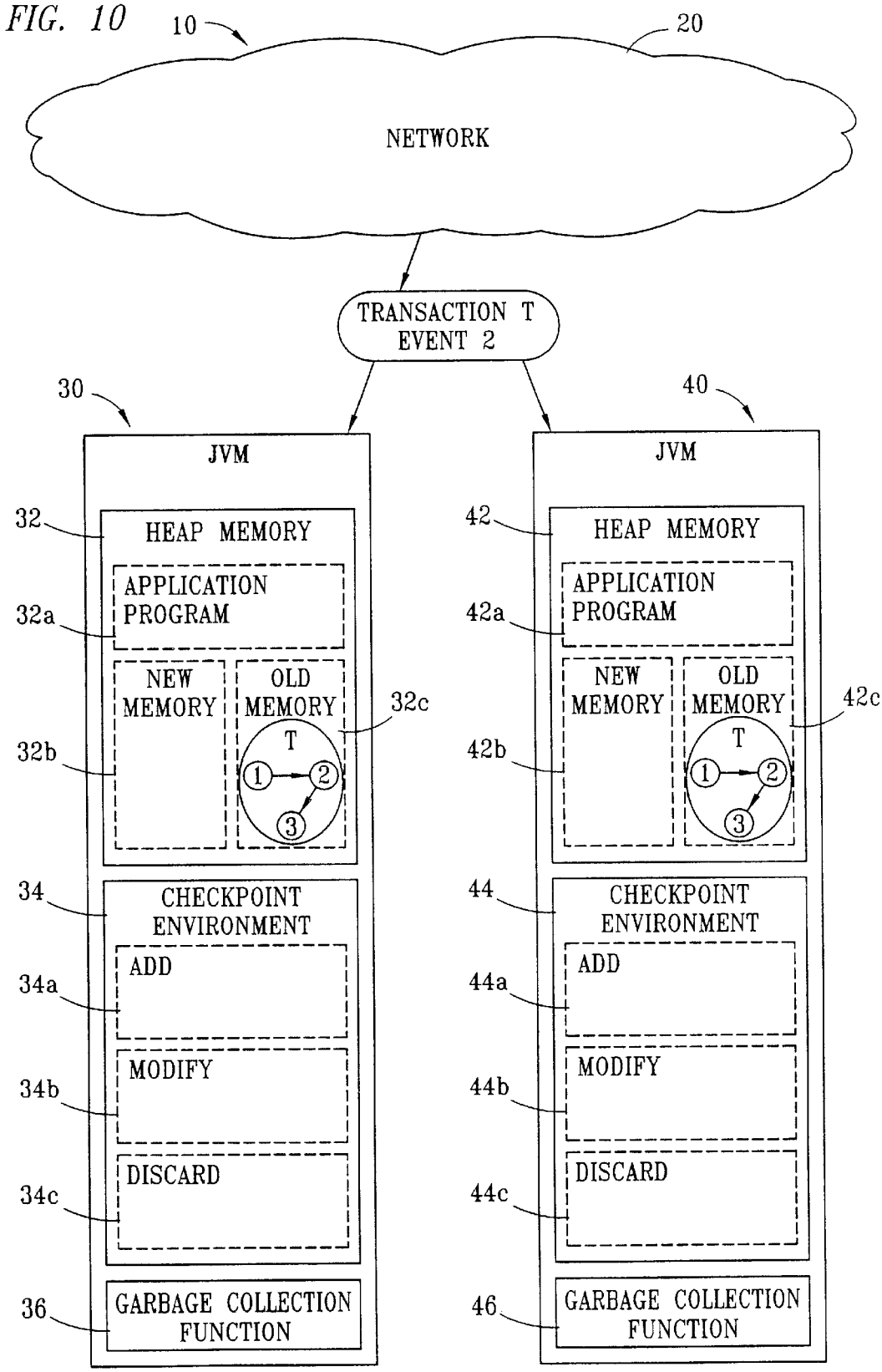

In step 206, the JVMs 30 and 40 await receipt of the second event of the transaction T from the network 20. Upon transmission from the network 20 of the second event of the transaction T, as depicted in FIG. 10, both JVMs 30 and 40 receive and record the event in the respective heap memories 32 and 42.

In step 208, a determination is made by the first JVM 30 whether the event received in step 206 is the first event of a new network transaction T. Since in the present example, the current event is a second event and not a first event, execution proceeds to step 212. In step 212, the write barrier of the first JVM 30 begins tracking the creation, modification, and deletion of data objects associated with the transaction T, as the current second event is processed.

Figure 11:
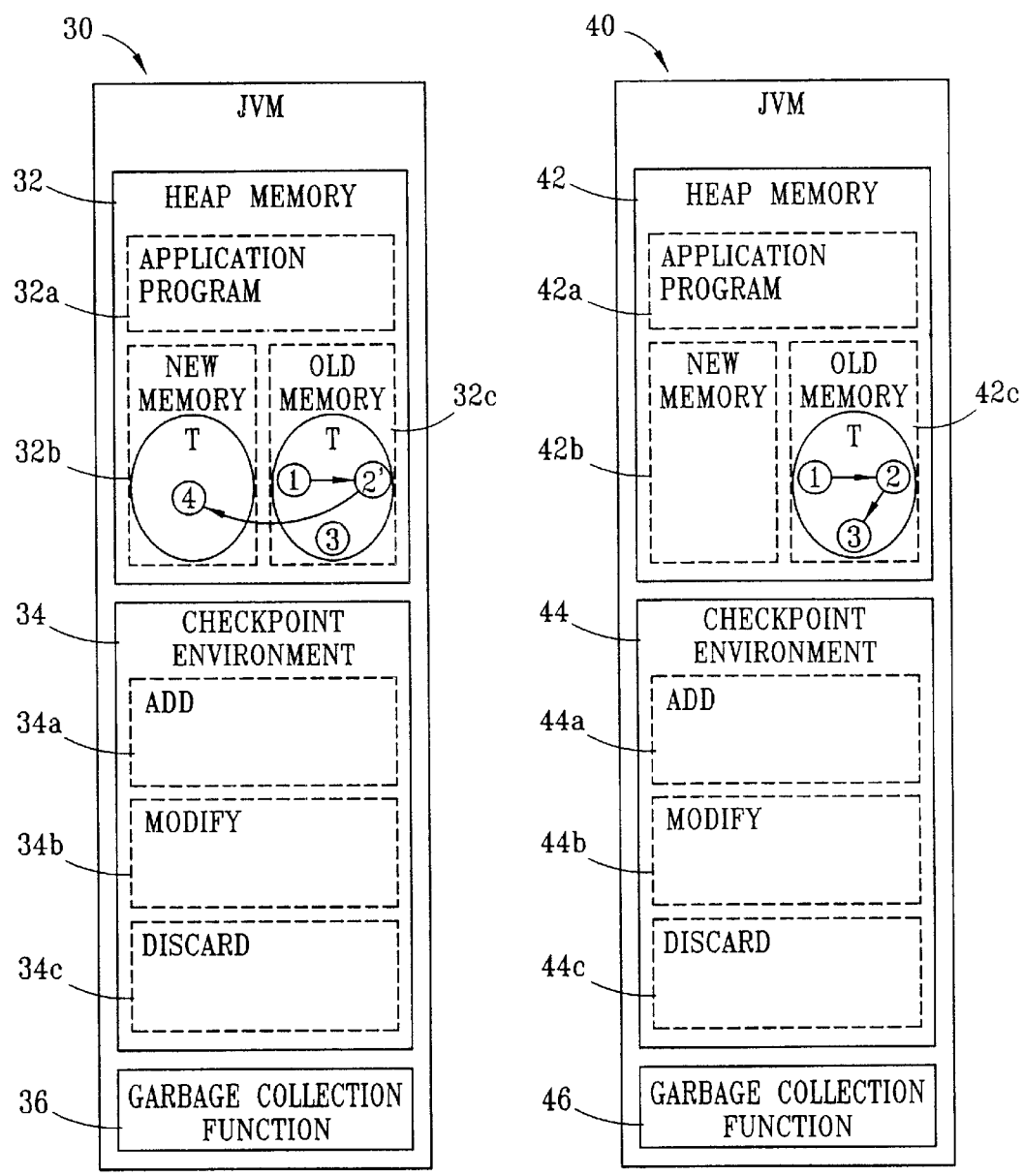
Figure 12:
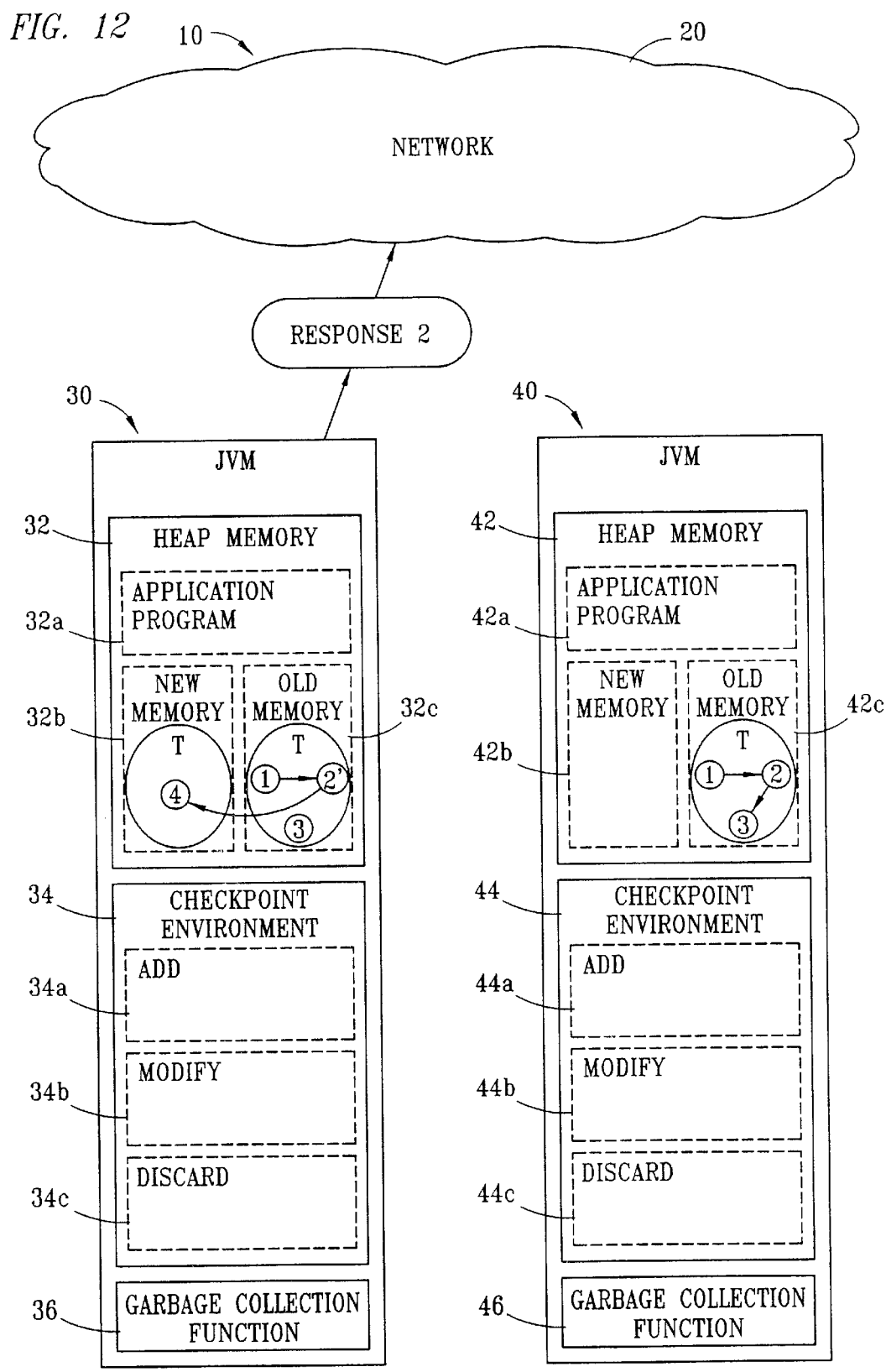

In step 214, the current event, as the second event in the sequence of the present example, is processed, in a manner well-known in the art, by the application program stored in the memory portion 32a of the first JVM 30. As the second event is so processed, the data object 2 is changed to data object 2', and the pointer from data object 2' is redirected to a new data object 4 which is created in the NEW h memory 32b for the transaction T, as depicted in FIG. 11. The data (root) object 1 remains unmodified. In step 216, upon completion of the processing of the second event in step 214, an appropriate response is generated and transmitted to the network 20, as depicted in FIG. 12. During the processing of the event, the checkpoint environment 34 is updated; accordingly, the object 4 is added to the ADD portion. 34a, and the data object 2' is added to the MODIFY portion 34b.

In step 218, the first JVM 30 makes a determination, as discussed above with respect to the first event, whether the current (i.e., second) event is the last event of the transaction T being processed. In the present example, the event last processed (i.e., the second event) does not constitute the last event of the transaction T and execution will proceed from step 218 to step 222.

In step 222, the data objects are garbage collected by the garbage collection function 36. Accordingly, because no object is pointing to the data object 3, that data object is discarded, and its identity recorded in the DISCARD portion 34c of the checkpoint environment 34. The new created data object 4 is "promoted" from the NEW memory 32b to the OLD memory 32c, as shown in FIG. 13.

In step 224, the content of the checkpoint is calculated. At this point, changes to the heap space (for the purpose of checkpointing) are no longer tracked by the write barrier. The checkpointing function uses data in the ADD (34a), MODIFY (34b) and DISCARD (34c) portions of the checkpoint environment 34, to determine the changes to the program state which must be communicated to the backup JVM 40.

In step 226, the objects to be copied to the backup JVM 40 are "marshaled". The objects to be copied and the list of objects to be discarded, together with any necessary administrative data, is formed into a checkpoint message which can be sent between JVMs.

Figure 14:
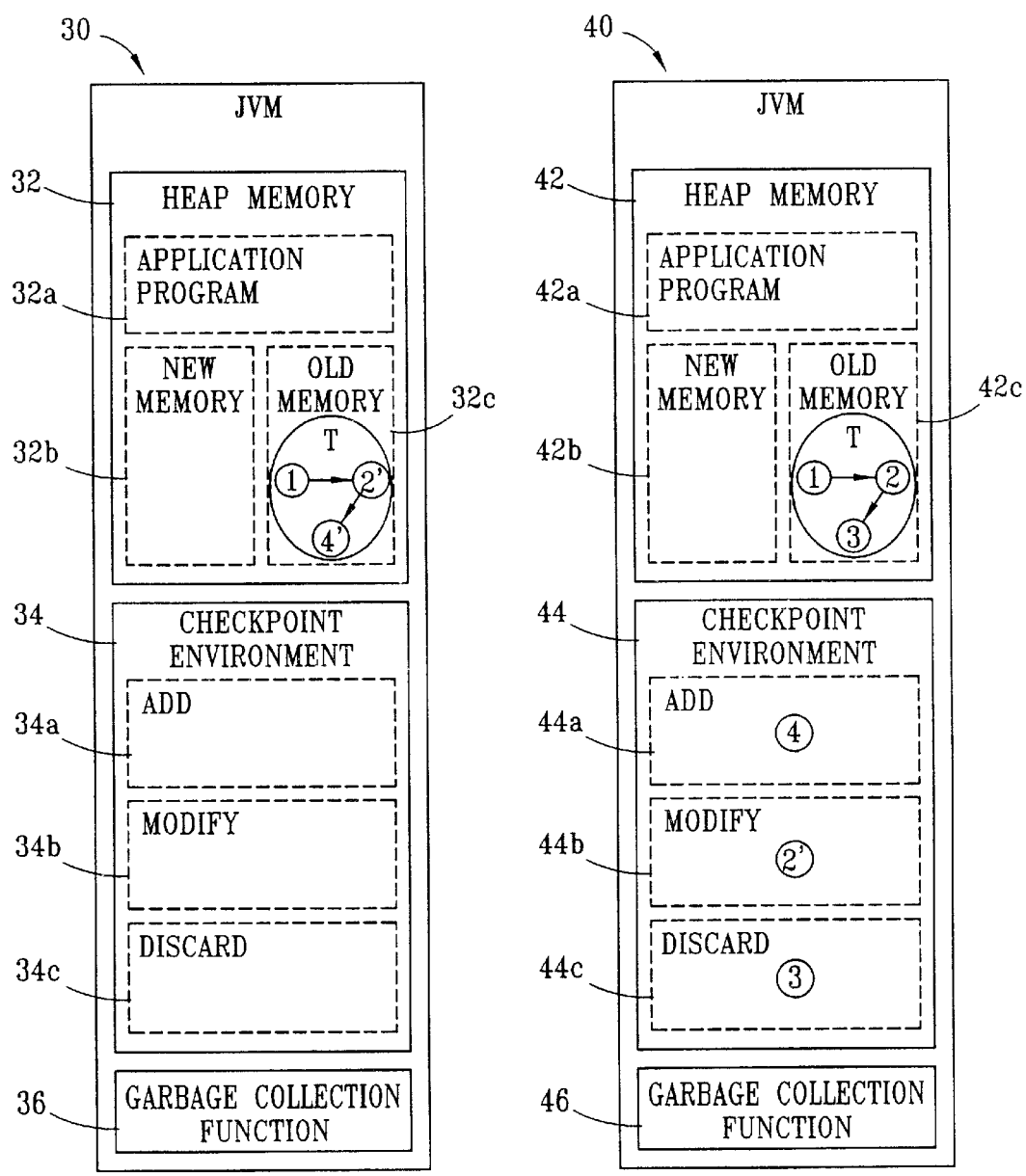

In step 228, the checkpoint generated in step 226, comprising all objects stored in the checkpoint environment 34, is delivered to the checkpoint environment 44 of the second JVM 40, as shown in FIG. 14. The ADD (34a), MODIFY (34c), and DISCARD (34c) portions of the checkpoint environment 34 are cleared of data associated with the current (i.e., second) event of the transaction T.

Figure 15:
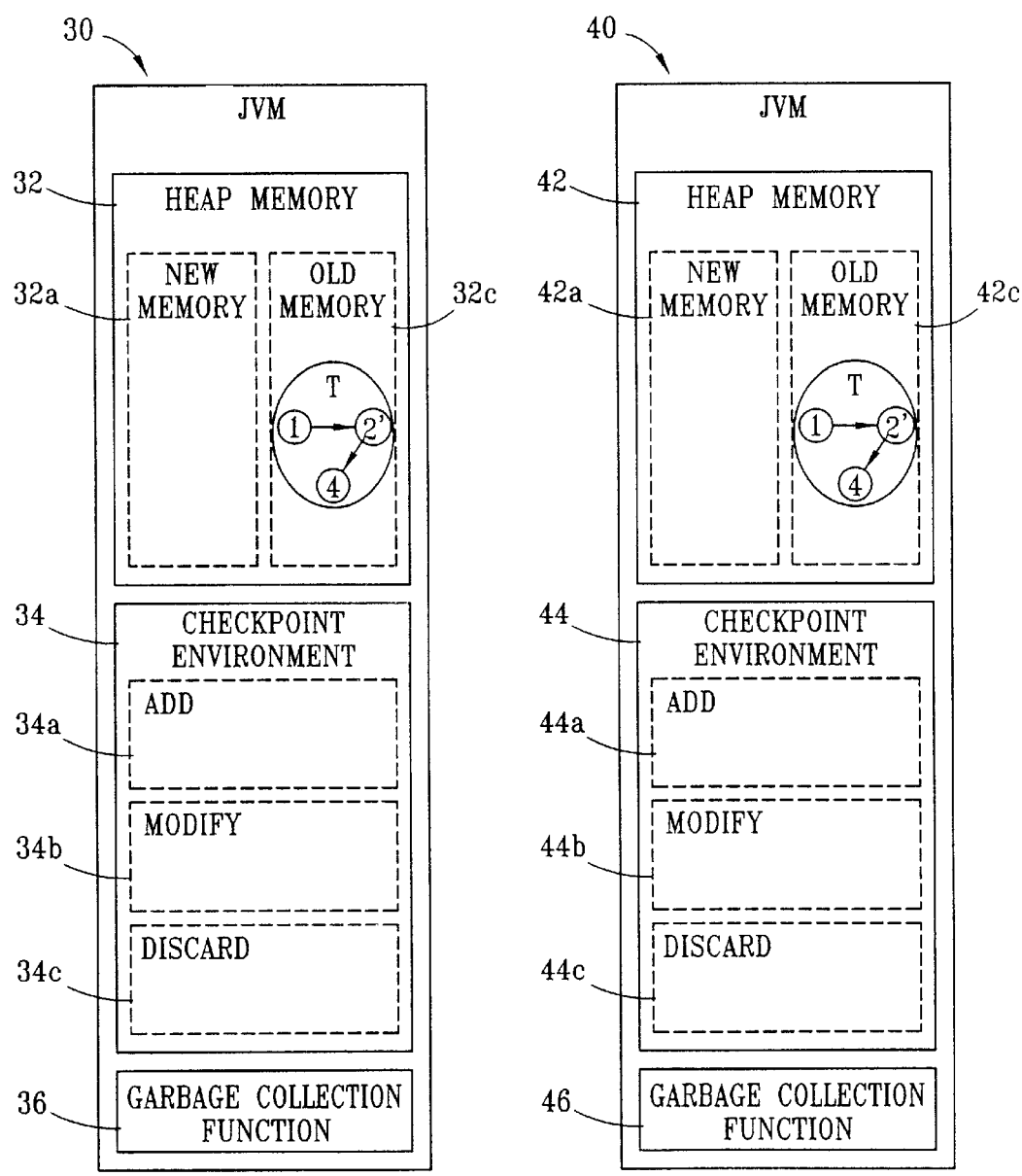

In step 230, the checkpoint stored in the checkpoint environment 44 is moved to the OLD memory 42c of the second JVM 40, as shown in FIG. 15. Additionally, the pointers are modified so that tags identifying objects pointed to are replaced with location addresses in the OLD memory 42c, so that pointers used by the first JVM 30 are correctly converted to point to the same objects in the second JVM 40.

Execution of the foregoing steps 228 and 230 is preferably performed immediately following step 226 so that the transaction state of memory in the JVMs 30 and 40 are at substantially all times virtually identical. Upon completion of step 230, execution returns to step 204.

As discussed above with respect to completion of the first event, it can be appreciated that, upon completion of the second event, the state of the transaction T in old memories 32c and 42c of the JVMs 30 and 40, respectively, as depicted in FIG. 15, are virtually identical. Therefore, either of the JVMs 30 or 40 may process a next (third) event of the transaction T.

In step 204, the JVMs 30 and 40 await the next event of the transaction T from the network 20. Upon receipt of the next event, i.e., the third event in the sequence of the present example, conventional protocols are implemented as discussed above to determine which of the JVMs 30 or 40 will process the next event of the transaction T received from the network 20. In the present example, it is assumed that the first JVM 30 has not failed and is available and will therefore continue to process the transaction. Therefore, the first JVM 30 will be designated to process the next event of the transaction T and continue as the primary JVM, and the second JVM 40 will continue as a backup JVM.

Figure 16:
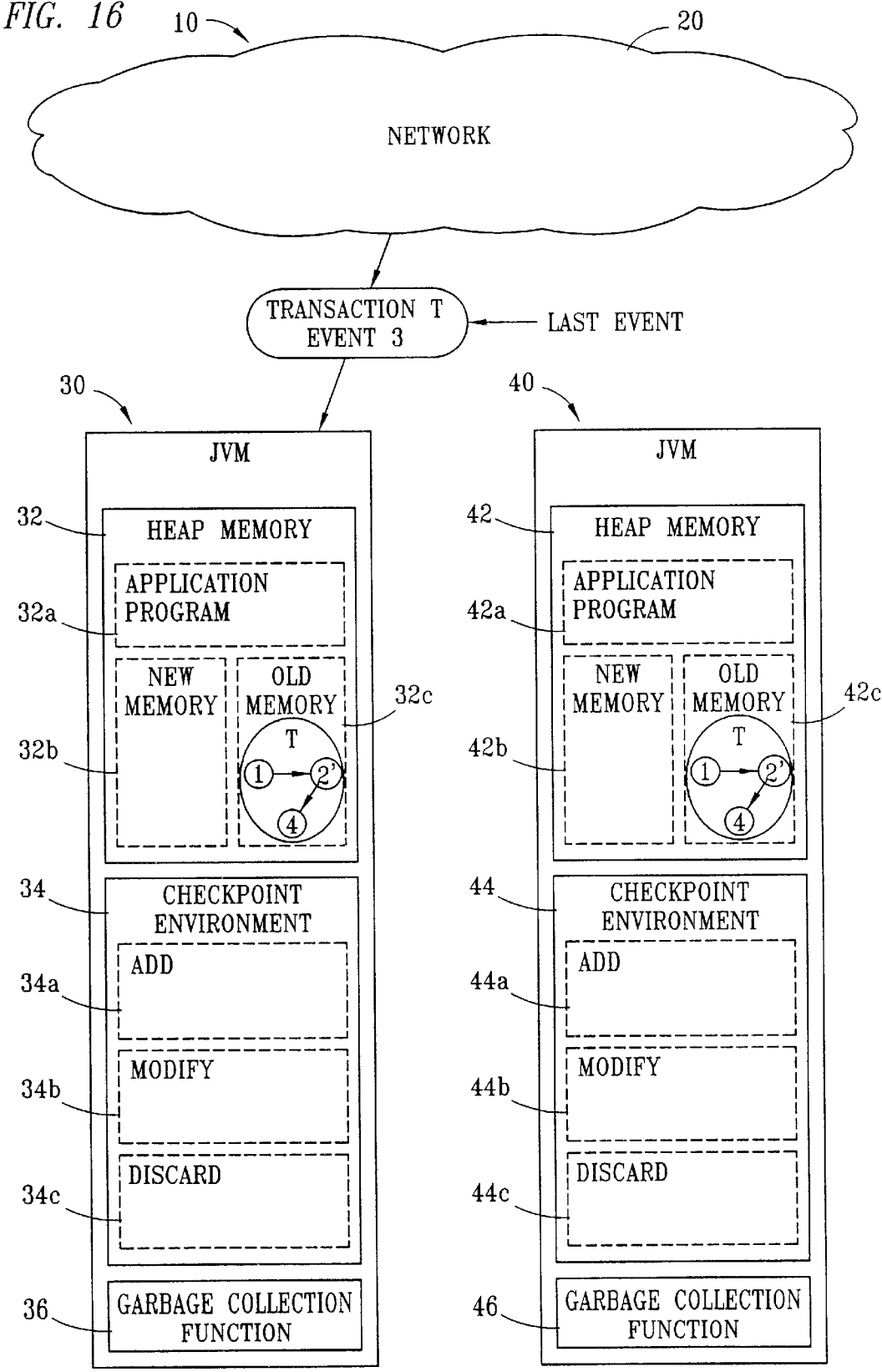

In step 206, the JVMs 30 and 40 await receipt of the third event of the transaction T from the network 20. Upon transmission from the network 20 of the third event of the transaction T, as depicted in FIG. 16, both JVMs 30 and 40 receive and record the event in the respective heap memories 32 and 42.

In step 208, a determination is made by the first JVM 30 whether the event received in step 206 is the first event of a new network transaction T. Since in the present example, the current event is a third event and not a first event, execution proceeds to the step 212. In step 212, the write barrier of the first JVM 30 begins tracking the creation, modification, and deletion of data objects associated with the transaction T, as the current third event is: processed.

Figure 18:
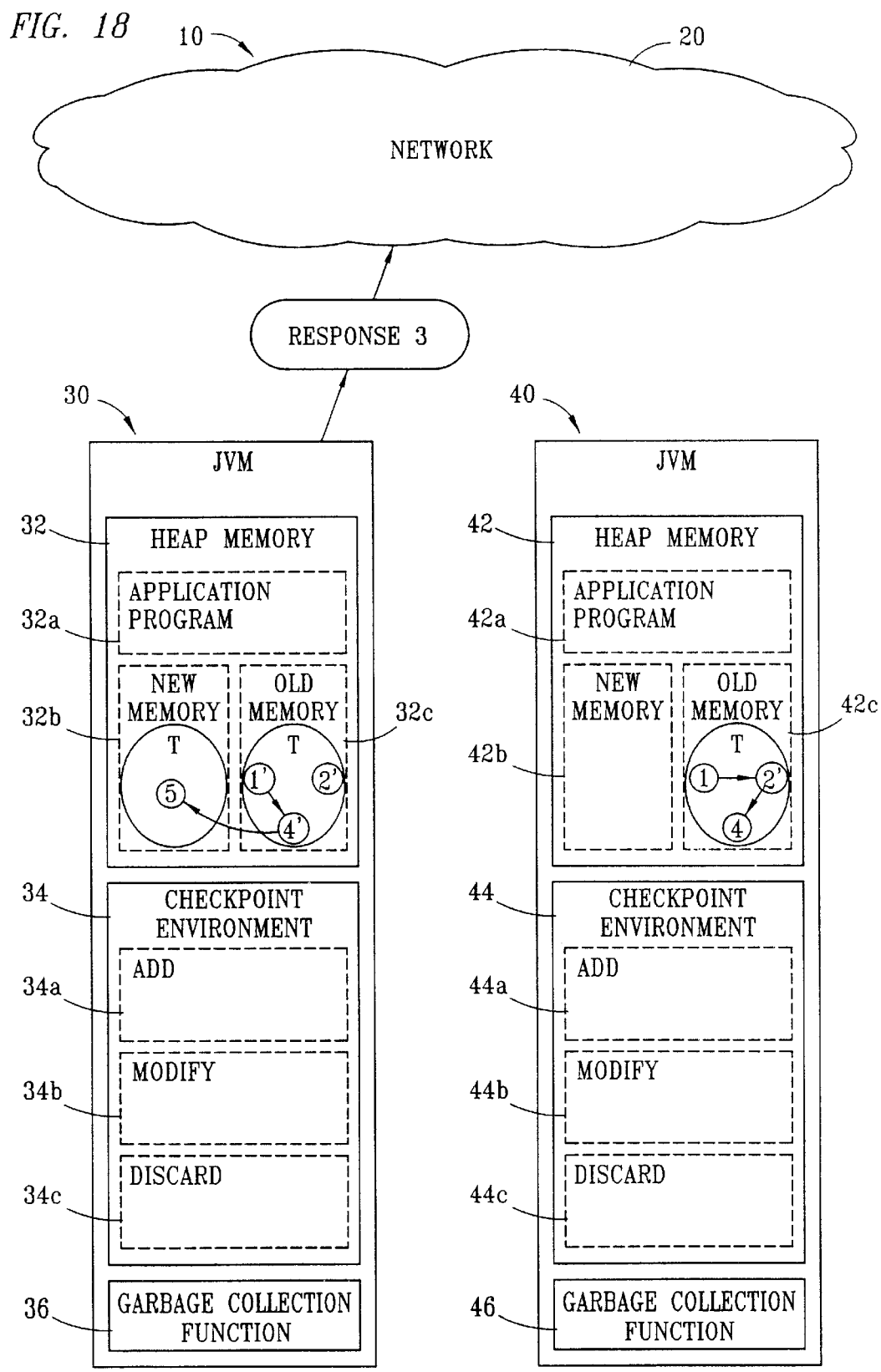

In step 214, the current event, as the third event in the sequence of the present example, is processed, in a manner well-known in the art, by the application program stored in the memory portion 32a of the first JVM 30. The processing of the event in step 214 is preferably run to completion. As the third event is so processed, the root data object 1 is modified to be data object 1', the data object 4 is modified to be data object 4', and the pointer from data object 1' is redirected to the modified data object 4', as depicted in FIG. 17. Additionally, a new data object 5 is created in the NEW memory 32b, and the pointer from the object 4 is directed to the object 5. In step 216, upon completion of the processing of the third event in step 214, an appropriate response is generated and transmitted to the network 20, as depicted in FIG. 18. During the processing of the event, the checkpoint environment 34 is updated. Accordingly, the object 5 is added to the ADD portion 34a, and the data objects 1' and 4' are added to the MODIFY portion 34b.

In step 218, the first JVM 30 makes a determination, as discussed above with respect to the first event, whether the current (i.e., third) event is the last event of the transaction T being processed. In the present example, the third event constitutes the last event. Therefore, execution proceeds to step 220 wherein processing of the transaction T is complete and all data objects associated with the transaction T are discarded from both JVMs 30 and 40. In the present case, the identity of all objects associated with transaction T is effectively added to the DISCARD portion 34c of the checkpoint environment 34. A (final) checkpoint message is sent from the primary JVM 30 to the backup JVM 40 indicating that the transaction is complete and that all saved state objects may be discarded. The primary JVM 30 then clears its checkpoint environment 34 of all data associated with the transaction T and, upon receipt of the message sent from the JVM 30 to the JVM 40, the backup JVM 40 similarly discards the contents of its checkpoint environment 42.

The configuration of the JVMs 30 and 40 then returns to that shown in FIG. 1, and execution returns to step 204.

By the use of the present invention, existing JVM functions such as garbage collection facilities, are enhanced so that application programs running on the JVM may be automatically checkpointed to one or more backup JVMs. Key internal functions of the JVM, such as its garbage collection function with a write barrier, as well as its internal knowledge of object structures, are reused and expanded upon to offer maximum efficiency to automatically determine checkpoint content and encode the checkpoint for transmission to one or more backups JVMs. In this manner, construction of a fault-tolerant system 10 is facilitated, thereby enabling transactions to be continually processed, and preventing the failure of an individual JVM (for example, due to hardware failure) to cause an entire individual transaction to fail. Such checkpointing may be achieved without requiring any additions to or modifications of the source code or object code of the application, thereby simplifying both the development and testing of such software programs without undue burden. Checkpointing is also synchronized with garbage collection so that data that is to be checkpointed between JVMs is minimized. Such checkpointing may also be faster and more reliable than conventional checkpointing.

It is understood that the present invention can take many forms and embodiments. Accordingly, several variations may be made in the foregoing without departing from the spirit or the scope of the invention; for example, more than one application program may be loaded into a single JVM 30 or 40, and the primary JVM may deliver the checkpoint to more than one backup JVM.

In another variation, any one of a number of different types of garbage collection algorithms may be implemented.

In still another variation, determination of the checkpoint contents may be refined so that only changed portions of objects are transferred between machines, rather than complete objects as shown in the description above.

In still another variation, the objects that are to be discarded, rather than just the identity of such objects, may be stored in the DISCARD memory portion 34c.

In yet another variation, the step 230 may be bypassed and the checkpoint maintained in the checkpoint environment 44, or stored in other memory, such as a hard disk, until the JVM 30 fails, at which time the checkpoint is moved to the OLD memory 42c of the heap memory 42, and pointers are modified as discussed above. In addition to the advantages discussed above, such a variation would conserve the heap memory 42 and require less overall processor time from the JVM 40.

In yet another variation, the steps 228 and 230 may be combined, and a checkpoint from the first JVM 30 may be delivered directly to the memory 42c of the JVM 40 without being intermediately stored in the checkpoint environment 44. In addition to the advantages discussed above, such a variation would be more efficient and would permit the JVM 40 to be configured without the checkpoint environment 44, thereby also conserving memory resources.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

What is claimed is:

1. A method for providing a first Java Virtual Machine ("JVM") with mechanisms to support fault-tolerant operation, comprising the steps of:
   (a) modifying the first JVM to use information maintained by the first JVM to identify objects that are created, modified, and/or discarded during a process of responding to an event of a transaction, such objects that are created, modified, and/or discarded during a process of responding to an event of a transaction defining at least a portion of a checkpoint;
   (b) delivering to at least one second JVM the at least a portion of a checkpoint; and
   (c) storing in the at least one second JVM the at least a portion of a checkpoint for use by the at least one second JVM in the processing of subsequent events of the transaction.

2. The method of claim 1 further comprising providing the first JVM with a garbage collection function having a write barrier, and wherein the step of modifying further comprises using the write barrier to track objects that are created, modified, and/or discarded during a process of responding to an event of a transaction.

3. The method of claim 1 further comprising providing the first JVM with a write barrier, and wherein the step of modifying further comprises using the write barrier to track objects that are created, modified, and/or discarded during a process of responding to an event of a transaction.

4. The method of claim 1 further comprising the steps of:

(a) garbage collecting objects stored on the first JVM prior to the step of delivering; and
(b) modifying the first JVM to use information maintained by the first JVM to identify objects that are created, modified, and/or discarded during the step of garbage collection.

5. The method of claim 1 wherein the first JVM comprises a first checkpoint environment, the at least one second JVM comprises at least one second checkpoint environment, and the step of modifying further comprises storing the at least a portion of a checkpoint in the first checkpoint environment, and the step of delivering further comprises delivering the at least a portion of a checkpoint to the at least one second checkpoint environment of the at least one second JVM, and the step of storing further comprises the step of transferring the at least a portion of a checkpoint from the at least one second checkpoint environment to a memory of the at least one second JVM.

6. The method of claim 1 further comprising, substantially immediately subsequent to the step of storing, the step of processing the at least a portion of a checkpoint so that substantially the same transaction state is maintained in the memories of the first JVM and the at least one second JVM at substantially all times.

7. The method of claim 1 further comprising, subsequent to the step of delivering, storing the at least a portion of a checkpoint into a checkpoint environment of the at least a second JVM and, upon a failure of the first JVM, transferring the at least a portion of a checkpoint into memory of the at least one second JVM and replicating in the memory of the at least one second JVM the transaction state of the first JVM prior to failure of the first JVM so that the at least one second JVM is enabled to process subsequent events of the transaction.

8. The method of claim 1 wherein the at least a portion of a checkpoint further comprises administrative data for managing the at least a portion of a checkpoint.

9. The method of claim 1 wherein the step of delivering further comprises encoding and decoding objects and/or portions of objects.

10. The method of claim 1 wherein the step of delivering further comprises encoding and decoding objects and/or portions of objects, and the steps of encoding and decoding further comprises the steps of tracking pointers in the first JVM and adjusting pointers within the at least one second JVM to replicate in the at least one second JVM the relationships created between objects in the memory of the first JVM.

11. The method of claim 1 wherein the step of modifying further comprises determining within the first JVM the necessary content of the at least a portion of a checkpoint to permit replication in the at least one second JVM of the transaction state in the first JVM subsequent to the processing of an event of a transaction.

12. A method for providing a first Java Virtual Machine ("JVM") with mechanisms to support fault-tolerant operation, comprising the steps of:
(a) modifying the first JVM to use information maintained by the first JVM to identify objects that are created, modifications that are made to objects, and/or objects that are discarded during a process of responding to an event of a transaction, such objects that are created, modifications that are made to objects, and/or objects that are discarded during a process of responding to an event of a transaction defining at least a portion of a checkpoint;
(b) delivering to at least one second JVM the at least a portion of a checkpoint; and
(c) storing in the at least one second JVM the at least a portion of a checkpoint for use by the at least one second JVM for processing subsequent events of the transaction.

13. The method of claim 12 further comprising providing the first JVM with a garbage collection function having a write barrier, and wherein the step of modifying further comprises using the write barrier to track objects that are created, modifications that are made to objects, and/or objects that are discarded during a process of responding to an event of a transaction.

14. The method of claim 12 further comprising providing the first JVM with a write barrier, and wherein the step of modifying further comprises using the write barrier to track objects that are created, modifications that are made to objects, and/or objects that are discarded during a process of responding to an event of a transaction.

15. The method of claim 12 further comprising the steps of:
(a) garbage collecting objects stored on the first JVM prior to the step of delivering; and
(b) modifying the first JVM to use information maintained by the first JVM to identify objects that are created, modifications that are made to objects, and/or objects that are discarded during the step of garbage collection.

16. The method of claim 12 wherein the first JVM comprises a first checkpoint environment, the at least one second JVM comprises at least one second checkpoint environment, and the step of modifying further comprises storing the at least a portion of a checkpoint in the first checkpoint environment, and the step of delivering further comprises delivering the at least a portion of a checkpoint to the at least one second checkpoint environment of the at least one second JVM, and the step of storing further comprises the step of transferring the at least a portion of a checkpoint from the at least one second checkpoint environment to a memory of the at least one second JVM.

17. The method of claim 12 further comprising, substantially immediately subsequent to the step of storing, the step of processing the at least a portion of a checkpoint so that substantially the same transaction state is maintained in the memories of the first JVM and the at least one second JVM at substantially all times.

18. The method of claim 12 further comprising, subsequent to the step of delivering, storing the at least a portion of a checkpoint into a checkpoint environment of the at least a second JVM and, upon a failure of the first JVM, transferring the at least a portion of a checkpoint into memory of the at least one second JVM and replicating in the memory of the at least one second JVM the transaction state of the first JVM prior to failure of the first JVM so that the at least one second JVM is enabled to process subsequent events of the transaction.

19. The method of claim 12 wherein the at least a portion of a checkpoint further comprises administrative data for managing the at least a portion of a checkpoint.

20. The method of claim 12 wherein the step of delivering further comprises encoding and decoding objects and/or portions of objects.

21. The method of claim 12 wherein the step of delivering further comprises encoding and decoding objects and/or portions of objects, and the steps of encoding and decoding further comprises the steps of tracking pointers in the first JVM and adjusting pointers within the at least one second JVM to replicate in the at least one second JVM the relationships created between objects in the memory of the first JVM.

22. The method of claim 12 wherein the step of modifying further comprises determining within the first JVM the necessary content of the at least a portion of a checkpoint to permit replication in the at least one second JVM of the transaction state in the first JVM subsequent to the processing of an event of a transaction.

23. A method for providing a first Java Virtual Machine ("JVM") with mechanisms to support fault-tolerant operation, comprising the steps of:

(a) modifying the first JVM to use information maintained by the first JVM to identify objects that are created, modified, and/or discarded during a process of responding to an event of a transaction, such objects that are created, modified, and/or discarded during a process of responding to an event of a transaction defining at least a portion of a checkpoint; and (b) storing the at least a portion of a checkpoint in a checkpoint memory accessible by the at least one second JVM for use by the at least one second JVM in the processing of subsequent events of the transaction.

24. The method of claim 23 further comprising providing the first JVM with a garbage collection function having a write barrier, and wherein the step of modifying further comprises using the write barrier to track objects that are created, modified, and/or discarded during a process of responding to an event of a transaction.

25. The method of claim 23 further comprising providing the first JVM with a write barrier, and wherein the step of modifying further comprises using the write barrier to track objects that are created, modified, and/or discarded during a process of responding to an event of a transaction.

26. The method of claim 23 further comprising the steps of:

(a) garbage collecting objects stored on the first JVM prior to the step of delivering; and (b) modifying the first JVM to use information maintained by the first JVM to identify objects that are created, modified, and/or discarded during the step of garbage collection.

27. The method of claim 23 wherein the first JVM comprises a first checkpoint environment, the at least one second JVM comprises at least one second checkpoint environment, and the step of modifying further comprises saving the at least a portion of a checkpoint in the first checkpoint environment, and the step of storing further comprises storing the at least a portion of a checkpoint to the at least one second checkpoint environment of the at least one second JVM, and transferring the at least a portion of a checkpoint from the at least one second checkpoint environment to a memory of the at least one second JVM.

28. The method of claim 23 further comprising, substantially immediately subsequent to the step of storing, the step of processing the at least a portion of a checkpoint so that substantially the same transaction state is maintained in the memories of the first JVM and the at least one second JVM at substantially all times.

29. The method of claim 23 further comprising, subsequent to the step of storing, saving the at least a portion of a checkpoint into a checkpoint environment of the at least a second JVM and, upon a failure of the first JVM, transferring the at least a portion of a checkpoint into memory of the at least one second JVM and replicating in the memory of the at least one second JVM the transaction state of the first JVM prior to failure of the first JVM so that the at least one second JVM is enabled to process subsequent events of the transaction.

30. The method of claim 23 wherein the at least a portion of a checkpoint further comprises administrative data for managing the at least a portion of a checkpoint.

31. The method of claim 23 wherein the step of delivering further comprises encoding and decoding objects and/or portions of objects.

32. The method of claim 23 wherein the step of delivering further comprises encoding and decoding objects and/or portions of objects, and the steps of encoding and decoding further comprises the steps of tracking pointers in the first JVM and adjusting pointers within the at least one second JVM to replicate in the at least one second JVM the relationships created between objects in the memory of the first JVM.

33. The method of claim 23 wherein the step of modifying further comprises determining within the first JVM the necessary content of the at least a portion of a checkpoint to permit replication in the at least one second JVM of the transaction state in the first JVM subsequent to the processing of an event of a transaction.

* * * * *

UNITED STATES PATENT AND TRADEMARK OFFICE
CERTIFICATE OF CORRECTION

PATENT NO.     : 6,421,739 B1
DATED          : July 16, 2002
INVENTOR(S)    : Holiday It is certified that error appears in the above-identified patent and that said Letters Patent is hereby corrected as shown below:

Column 6,
Line 33, delete "stored-" and insert -- stored --

Column 7,
Line 40, delete "h"
Line 47, delete "portion." and insert -- portion --

Column 8,
Line 62, delete "is:" and insert -- is --

Signed and Sealed this

Tenth Day of December, 2002

JAMES E. ROGAN
*Director of the United States Patent and Trademark Office*